(12) United States Patent
Jain (10) Patent No.: US 11,860,864 B1
(45) Date of Patent: Jan. 2, 2024

(54) MATERIALIZED VIEWS AS A SERVICE FOR ANALYTICS

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/865,909

(22) Filed: Jul. 15, 2022

(51) Int. Cl.
*G06F 16/23* (2019.01)

(52) U.S. Cl.
CPC .............................. *G06F 16/2393* (2019.01)

(58) Field of Classification Search
CPC ............................ G06F 16/2393; G06F 16/27
See application file for complete search history.

(56) References Cited

U.S. PATENT DOCUMENTS

| 11,609,910 | B1* | 3/2023 | Papakonstantinou | ........................ G06F 16/24539 |
| 2009/0077085 | A1* | 3/2009 | Olivieri | ............... G06F 16/2393 707/999.009 |
| 2011/0137875 | A1* | 6/2011 | Ziauddin | ............. G06F 16/2393 707/693 |
| 2020/0133937 | A1* | 4/2020 | Cruanes | ............... G06F 16/2365 |
| 2022/0058183 | A1* | 2/2022 | Duffield | ............. G06F 16/24554 |
| 2022/0360600 | A1* | 11/2022 | Reed | .................... G06F 16/9537 |
| 2023/0004552 | A1* | 1/2023 | Cruanes | ............... G06F 16/2282 |
| 2023/0032686 | A1* | 2/2023 | Williams | ............. G06F 16/9535 |

OTHER PUBLICATIONS

Segev, Arie, and Weiping Fang. "Optimal update policies for distributed materialized views." Management Science 37.7 (1991): 851-870. (Year: 1991).*
Camacho-Rodríguez, Jesús, et al. "Apache hive: From mapreduce to enterprise-grade big data warehousing." Proceedings of the 2019 International Conference on Management of Data. 2019. (Year: 2019).*
Rabl, Tilmann, and Hans-Arno Jacobsen. "Materialized views in cassandra." Proceedings of 24th Annual International Conference on Computer Science and Software Engineering. 2014. (Year: 2014).*
Sen, Soumya, Debabrata Datta, and Nabendu Chaki. "An architecture to maintain materialized view in cloud computing environment for OLAP processing." 2012 International Conference on Computing Sciences. IEEE, 2012. (Year: 2012).*

* cited by examiner

*Primary Examiner* — William Spieler
(74) *Attorney, Agent, or Firm* — Buckley, Maschoff & Talwalkar LLC (57) ABSTRACT

Embodiments may facilitate data analytics for a cloud computing environment. A plurality of system tables may store system metadata that associates a first materialized view with a first view and a first table. A transaction compute unit may process an update request relevant to the first view. A query parser may capture the update request from the transaction compute unit and detect which system tables are associated with the update request relevant to the first view. Responsive to the request, the query processor arranges for first table data to be replicated and transmit a materialized view request to a materialized view compute unit. The materialized view compute unit may be created as a Materialized View-as-a-Service ("MVaaS") independent of the transaction compute unit. The materialized view compute unit may receive the materialized view request, refresh the first materialized view, compute the first materialized view, and store a result of the computation.

21 Claims, 13 Drawing Sheets

MATERIALIZED VIEWS AS A SERVICE FOR ANALYTICS

BACKGROUND

According to modern database terminology, a view is a SELECT statement that is stored as a database object. A view specifies one or more underlying base tables whose data is physically stored in the database. A view can be queried as if it is a database table, as in SELECT * FROM <view_name>. To execute such a query, the query definition and base tables may be merged into the query. Alternatively, the view may be materialized into an internal table which exists only during query execution. In either case, the SELECT statement of the view may be executed at query execution.

A materialized view is a database object associated with a query definition and whose result is computed and persisted in a database table. Materialized views are often created on frequently executed, expensive queries (such as those involving intensive aggregation and join operations). Materialized views are designed to improve performance in databases serving many queries having common sub-expressions resulting in repetitive operations on base tables, by pre-computing the common sub-expressions and re-writing received queries to use the corresponding materialized views where possible.

Dedicated processing is required to ensure that the persisted table of a materialized view remains synchronized with the underlying base tables. Moreover, materialized views inefficiently require persistence of the same data in two different locations (i.e., in the underlying base tables and in the persisted table of the materialized view).

Materialized views are often used in the cloud-based computing analytics domain. As used herein, the term "analytics" may refer to a systematic computational analysis of data or statistics (e.g., collecting information about the way a piece of software is used). The materialized view lets the system achieve low latency querying for complex analytic database views. Results of a complex query may be stored, such as results to determine hits on a certain Application Programming Interface ("API") grouped by tenant. This may use a query that goes over all of the APIs, gets the associated tenants, and performs the aggregates of the hits. Whenever this query is executed, the system needs to load the data and perform the computation (which leads to latency in the response). To reduce this, the system builds a new "view" of the data that stores the data in the appropriate way to support a particular query. This view's results are stored in a separate table structure where the results of the view are stored. When a query is received, the data is fetched from this table to quickly return a response.

Most databases, such as PostgreSQL, SAP® HANA, ORACLE®, etc. support materialized views. These databases, however, do not provide a pluggable means to create the materialized views. That is, the code is not loosely coupled and needs to be executed as part of the same process (or, at best, on the same machine or compute as the actual compute unit where the database is running transactions). As a result, every time the view needs to be refreshed with fresh data (which usually means that a compute-intensive process or thread must be run to update the views). Such an approach can impact existing transactions that are running on the system.

It would be desirable to perform big data analytics for a cloud computing environment in a secure and efficient manner.

SUMMARY

Methods and systems may facilitate data analytics for a cloud computing environment. A plurality of system tables may store system metadata that associates a first materialized view with a first view and a first table. A transaction compute unit may process an update request relevant to the first view. A query parser may capture the update request from the transaction compute unit and detect which system tables are associated with the update request relevant to the first view. Responsive to the request, the query processor arranges for first table data to be replicated and transmit a materialized view request to a materialized view compute unit. The materialized view compute unit may be created as a Materialized View-as-a-Service ("MVaaS") independent of the transaction compute unit. The materialized view compute unit may receive the materialized view request, refresh the first materialized view, compute the first materialized view, and store a result of the computation.

Some embodiments comprise: means for processing, by a transaction compute unit, an update request relevant to a first view, wherein a plurality of system tables store system metadata that associates a first materialized view with the first view and a first table; means for capturing, by a computer processor of a query parser, the update request from the transaction compute unit; means for detecting which system tables are associated with the update request relevant to the first view; responsive to the request, means for arranging for first table data to be replicated; means for transmitting a materialized view request to a materialized view compute unit, created as a MVaaS independent of the transaction compute unit; means for refreshing the first materialized view by the materialized view compute unit; means for computing the first materialized view by the materialized view compute unit; and means for storing, by the materialized view compute unit, a result of the computation.

Some technical advantages of some embodiments disclosed herein are improved systems and methods to perform big data analytics for a cloud computing environment in a secure and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
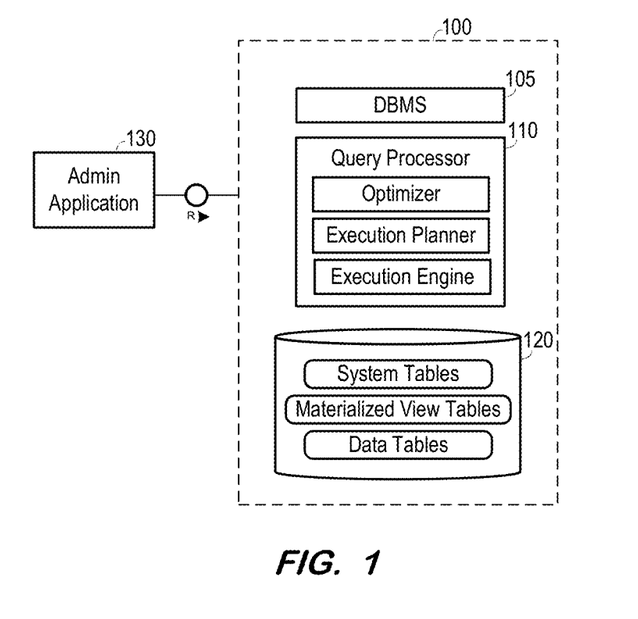
FIG. 1 is a block diagram of a database system providing temporary materialized tables according to some embodiments.

FIG. 1 is a block diagram of a database architecture according to some embodiments. Embodiments are not limited to the FIG. 1 architecture. The database system 100 includes a DataBase Management System ("DBMS") 105, a query processor 110, and a data store 120. Generally, the database system 100 operates to receive queries and return results based on data stored within the data store 120. A received query may include instructions to create, read, update, or delete one or more records. The database system 100 may comprise any single-node or distributed database system that is or becomes known.

Generally, the database management system 105 includes program code to perform administrative and management functions of the database system 100. Such functions may include external communication, lifecycle management, snapshot and backup, indexing, optimization, garbage collection, and/or any other database functions that are or become known.

The query processor 110 processes received Structured Query Language ("SQL") and Multi-Dimensional eXpression ("MDX") statements. The query processor 110 comprises program code executable to pre-process a received query, generate a query execution plan, and execute the plan. As will be described, the query processor 110 may operate in some embodiments to replace a named view within a query with a materialized view.

The data store 120 comprises data tables storing data and system tables storing metadata such as database catalog as is known in the art. The data store 120 of the present example also stores persisted tables of the above-described materialized views. The data store 120 may also comprise a distributed system using any combination of storage devices that are or become known.

In some embodiments, the data of data store 120 may comprise one or more of conventional tabular data, row-based data, column-based data, and object-based data. Moreover, the data may be indexed and/or selectively replicated in an index to allow fast searching and retrieval thereof. The database system 100 may support multi-tenancy to separately support multiple unrelated clients by providing multiple logical database systems which are programmatically isolated from one another.

The database system 100 may implement an "in-memory" database, in which a full database stored in volatile (e.g., non-disk-based) memory such as Random Access Memory ("RAM"). The full database may be persisted in and/or backed up to fixed disks (not shown). Embodiments are not limited to an in-memory implementation. For example, data may be stored in RAM (e.g., cache memory for storing recently used data) and one or more fixed disks (e.g., persistent memory for storing their respective portions of the full database).

An administrative application 130 may be operated by analyst to configure and manage the database system 100. The administrative application 130 may communicate with the DBMS 105 via a graphical user interface and/or console. Configuration of the database system 100 may include configuration of user permissions, specification of backup parameters, definition of logical schemas, definition of views, definition of materialized views, etc. These permissions, parameters and definitions may be stored within system tables of the data store 120 and used during operation of the database system 100.

Figure 2:
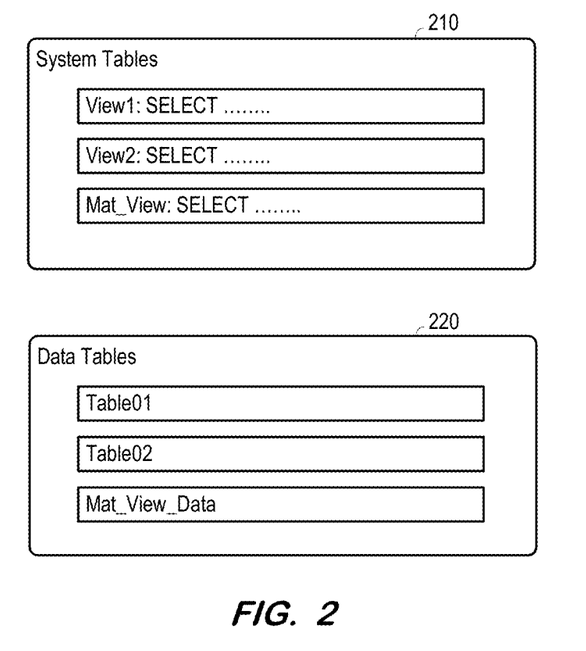
FIG. 2 illustrates system tables and data tables of a database system according to some embodiments.

FIG. 2 illustrates system tables 210 and data tables 220 of a database system according to some embodiments. The system tables 210 store database objects of two different views, View1 and View2. Each database object includes a SELECT statement specifying underlying base tables of each view.

The system tables 210 also store a database object associated with a materialized view Mat View. This database object includes a SELECT statement specifying underlying base tables of the materialized view. The materialized view Mat View is associated with a persisted table Mat View Data of the data tables 210.

Figure 3:
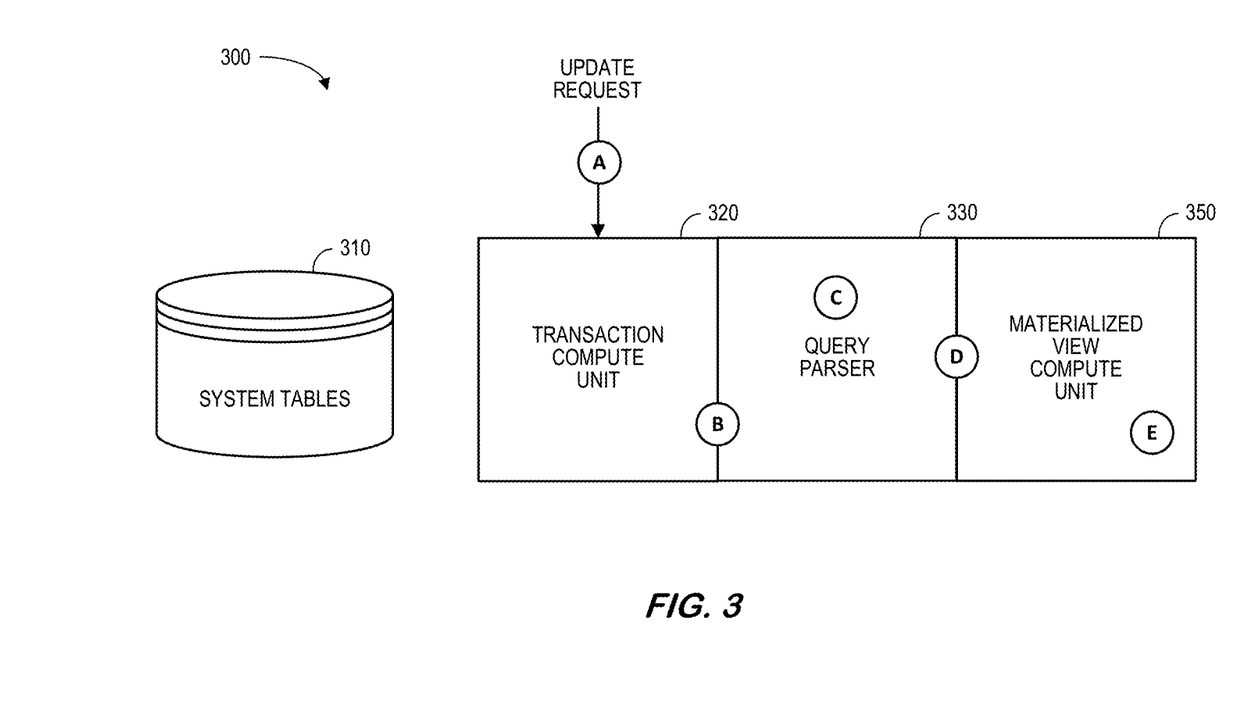
FIG. 3 is a high-level architecture for a system in accordance with some embodiments.

FIG. 3 is a high-level block diagram of a system 300 according to some embodiments. The system 300 includes system tables 310, a transaction compute unit 320, a query parser 330, and a materialized view compute unit 350. The system tables 310 may, according to some embodiments, include tables that store system metadata associating a first materialized view with a first view and a first table. At (A), the transaction compute unit 320 receives an update request and may process an update request relevant to the first view.

The query parser 330 may capture the update request from the transaction compute unit 320 at (B). The query parser 330 may then detect which system tables are associated with the update request relevant to the first view and (C) and, responsive to the request, arrange for first table data to be replicated. At (D) the query parser 330 transmits a materialized view request to the materialized view compute unit 350.

The materialized view compute unit 350 may be created, according to some embodiments, as a Materialized View-as-a-Service ("MVaaS") independent of the transaction compute unit. The materialized view compute unit 350 receive the materialized view request and refresh the first materialized view at (E). The materialized view compute unit 350 may then automatically compute the first materialized view and store a result of the computation. As used herein, the term "automatically" may refer to a device or process that can operate with little or no human interaction.

According to some embodiments, devices, including those associated with the system 300 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 300 may store data into and/or retrieve data from various data stores (e.g., the system tables 310), which may be locally stored or reside remote from the transaction compute unit 320. Although a materialized view compute unit 350 is shown in FIG. 3, any number of such devices may be included. Moreover, various devices described herein might be combined according to embodiments of the present invention. For example, in some embodiments, the transaction compute unit 320 and system tables 310 might comprise a single apparatus. Some or all of the system 300 functions may be performed by a constellation of networked apparatuses, such as in a distributed processing or cloud-based architecture.

An analyst may access the system 300 via a remote device (e.g., a Personal Computer ("PC"), tablet, or smartphone) to view data about and/or manage operational data in accordance with any of the embodiments described herein. In some cases, an interactive graphical user interface display may let the analyst define and/or adjust certain parameters (e.g., to set up or adjust various mapping relationships) and/or provide or receive automatically generated recommendations, results, and/or alerts from the system 300.

Figure 4:
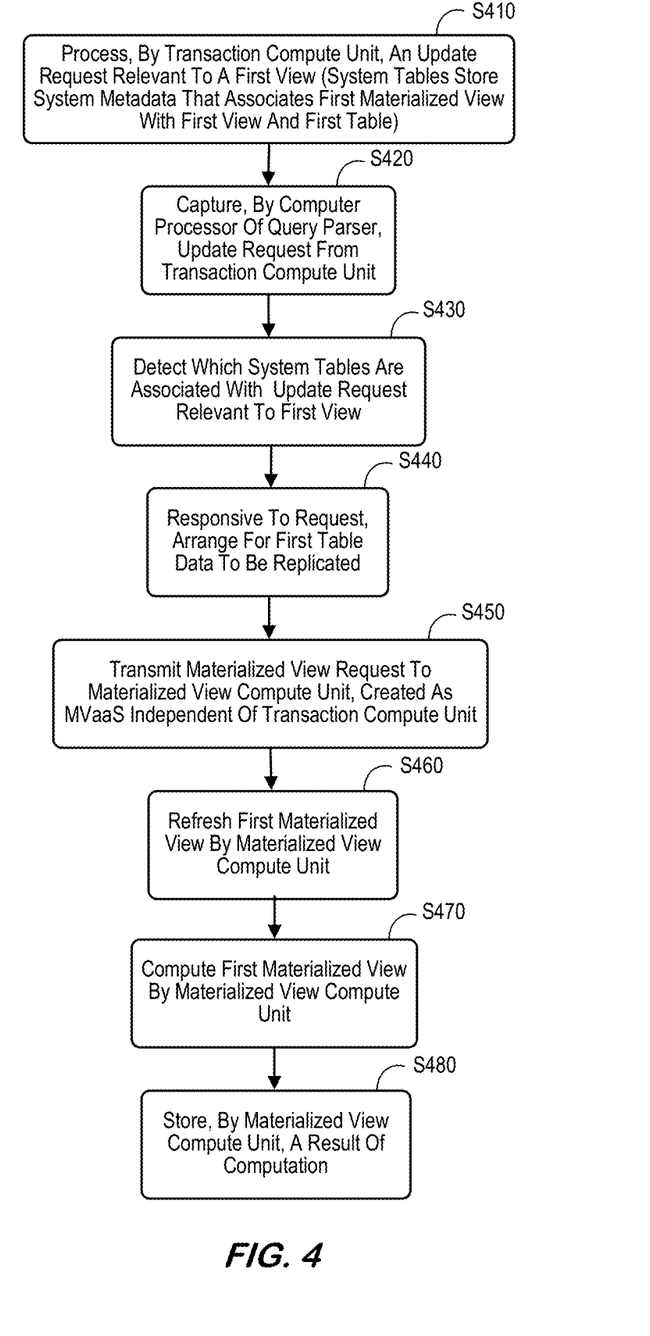
FIG. 4 illustrates a method according to some embodiments.

FIG. 4 illustrates a method to perform big data analytics for a cloud computing environment in a secure and efficient manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store instructions that when executed by a machine result in performance according to any of the embodiments described herein.

At S410, a transaction compute unit may process an update request relevant to a first view. Moreover, a plurality of system tables may store system metadata that associates a first materialized view with the first view and a first table. At S420, a computer processor of a query parser may capture the update request from the transaction compute unit. At S430, the system may detect which system tables are associated with the update request relevant to the first view. Responsive to the request, the system may arrange for first table data to be replicated at S440.

At S450, the system may transmit a materialized view request to a materialized view compute unit. The materialized view compute unit may, according to some embodiments, be created as a Materialized View-as-a-Service ("MVaaS") independent of the transaction compute unit. As used herein, the phrase "as-a-service" may refer to something being presented to a consumer as a service (e.g., providing endpoints, usually API driven, for customers or consumers to interface). As a result, compute unit resources of the materialized view compute unit (e.g., CPU, memory, etc.) can be scaled independently of those associated with the transaction compute unit. According to some embodiments, a plurality of materialized view compute units are associated with the transaction compute unit. In some embodiments, the transaction compute unit comprises a database transaction compute unit.

At S460, the system may refresh the first materialized view. At S470, the materialized view compute unit computes the first materialized view and store a result of the computation at S480. According to some embodiments, the computation of the first materialized view comprises serverless execution such that a process is only spun on demand. Note that the serverless execution might be achieved using a Linux container or a Web-assembly ("Wasm") module in a Wasm browser sandbox that has a memory heap not accessible from outside the Wasm browser sandbox.

Figure 5:
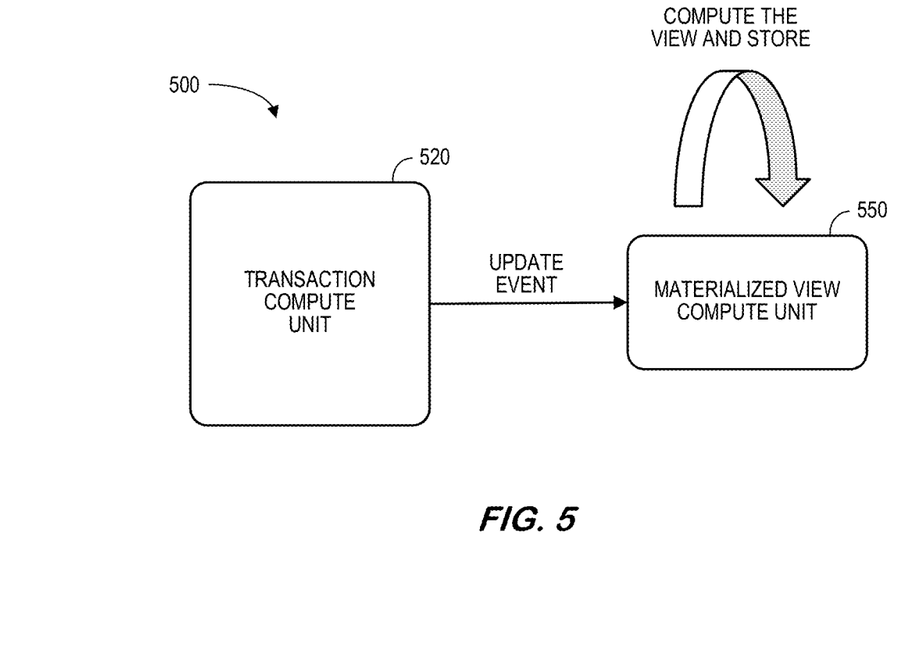
FIG. 5 is a system architecture in accordance with some embodiments.

Thus, embodiments may create a MVaaS that separates the management of materialized views into different compute units which can be scaled independently of transaction compute units 520 of the database. FIG. 5 is a system 500 architecture in accordance with some embodiments. The system 500 includes a transaction compute unit 520 that sends an update event to a materialized view compute unit 550. The system 500 may also include a means of capturing and transferring the updates relevant to a specific view from the transaction compute unit 520 to the materialized view compute unit 550. The computation can then run on the materialized view compute unit 550 (and be transferred from the same unit or transferred back to the transaction compute unit 520).

A query parser may detect which tables get used to create the specific view. For example, a materialized view may capture API hits for tenants grouped by different tenants. By parsing the query for the view, the system can determine that this query selects API hits from a certain table and then aggregates by tenant. If there is a replica of the database running on the materialized view compute unit 550, the transaction compute unit 520 (e.g., continuously and/or when it receives a request for updating the view) does following:

replicate the table data on the replica (note that replication may be a continuous process and not happen on receipt of the query—instead the materialized view request may only be sent to the materialized view compute unit 550 on receipt of the SQL query), and send a materialized view request to the materialized view compute unit 550.

As part of this process, the system may run a refresh of the materialized view on the materialized view compute unit 550. According to some embodiments, refresh of the materialized view can be performed a scheduled way (e.g., combined with data change detection on the materialized view compute units 550).

Figure 6:
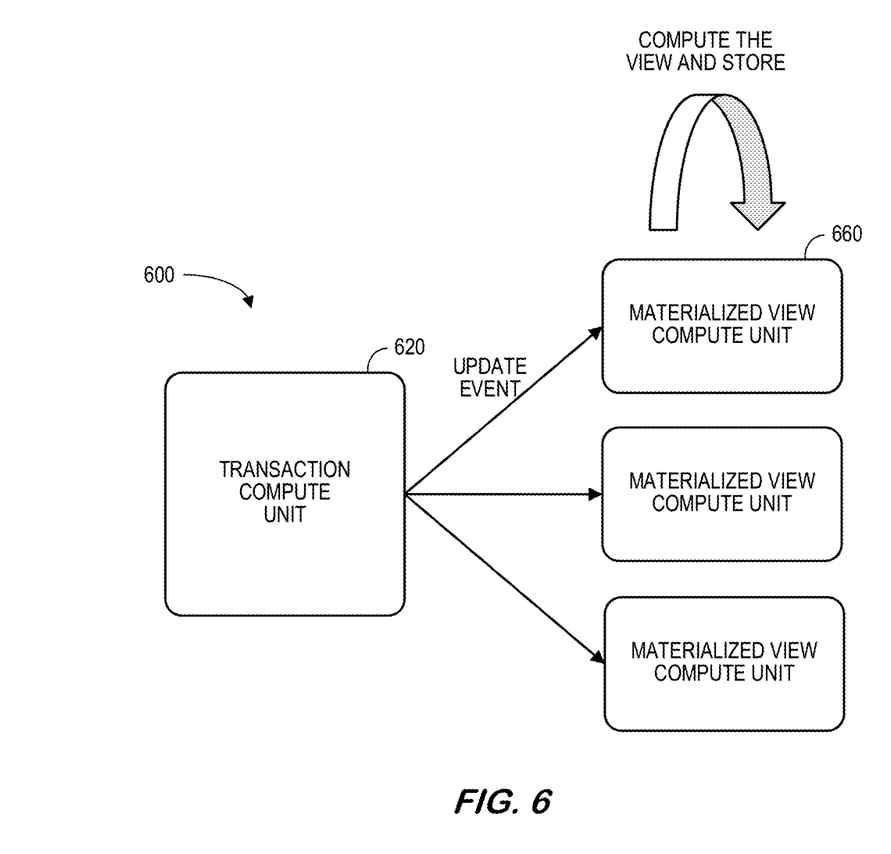
FIG. 6 is a system architecture supporting multiple materialized view compute units according to some embodiments.

Although a single materialized view compute unit 550 is illustrated in FIG. 5, note that embodiments may support multiple unit for multiple views. For example, FIG. 6 is a system 600 architecture that supports multiple materialized view compute units 650 according to some embodiments. The system 600 includes a transaction compute unit 620 that sends update events to the materialized view compute units 650 as appropriate.

Figure 7:
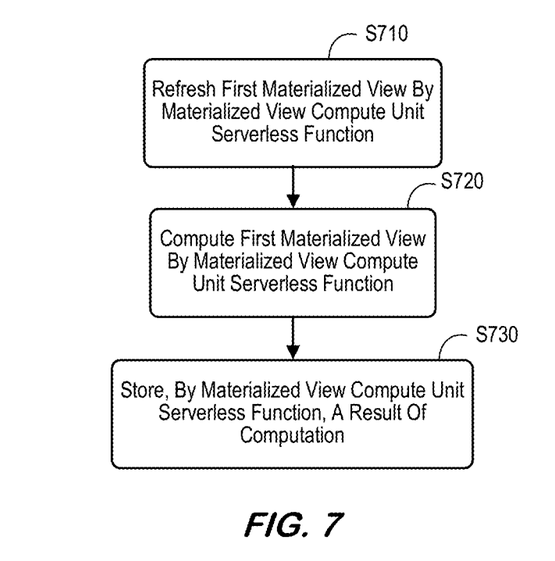
FIG. 7 is a serverless method in accordance with some embodiments.

According to some embodiments, on demand updates are a scheduled job (e.g., combined with data changes detected) which can trigger the serverless unit for refreshing the materialized views. Since the updates happen only on demand, a materialized view compute unit 650 can be designed in a way to execute the update process in a serverless way. That is, the process is only spun on demand to save compute resources (e.g., CPU and memory). FIG. 7 is a serverless method in accordance with some embodiments. At S710, the system may refresh a first materialized view using a materialized view compute unit serverless function. At S720, the first materialized view is computed by the materialized view compute unit serverless function. At S730, the materialized view compute unit serverless function can then store a result of the computation.

Figure 8:
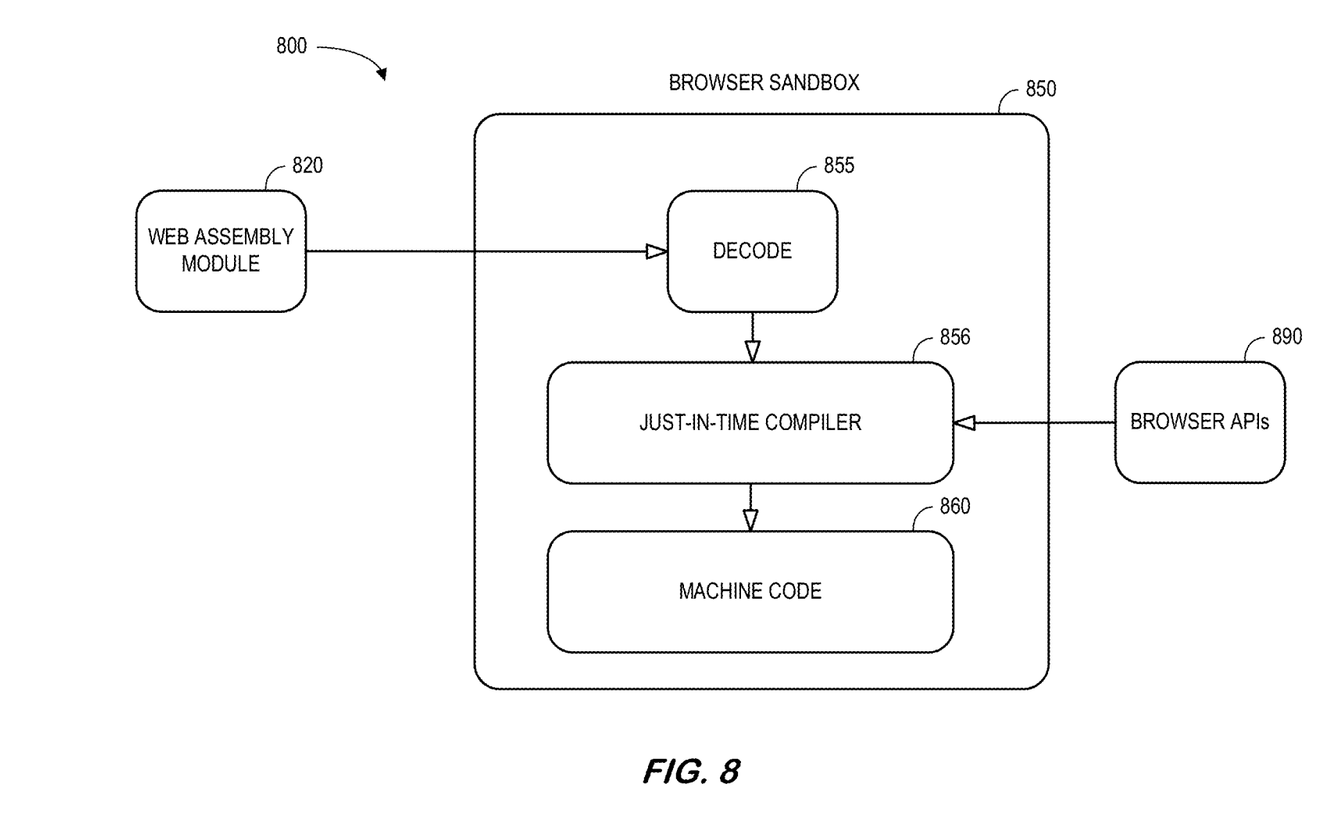
FIG. 8 is a high-level block diagram of "WebAssembly" system in accordance with some embodiments.

According to some embodiments, the serverless execution is achieved using Linux containers. In other embodiments, more granular serverless execution is achieved using WebAssembly modules ("Wasm"). Wasm provides a portable binary-code format and a corresponding text format for executable programs as well as software interfaces to facilitate interactions between programs and host environment. Wasm may enable high-performance applications on web pages and can be employed in other environments. It is an open standard that supports multiple languages on multiple operating systems. For example, FIG. 8 is a high-level block diagram of a Wasm system 800 where a client browser may execute a Wasm module in a Wasm browser sandbox (associated with a memory heap that is not accessible from outside the Wasm browser sandbox). In particular, a browser sandbox 850 may execute a WebAssembly module 820.

For the WebAssembly module 820, the browser sandbox 850 may utilize a decode element 855 before executing a Just-In-Time ("JIT") compiler 856 that also receives browser APIs 890. The output of the JIT compiler 856 may comprise machine code 860. According to some embodiments, the WebAssembly module 820 is a portable binary format designed to be: compact and fast to parse/load so it can be efficiently transferred, loaded, and executed by the browser; compatible with existing web platforms (e.g., to allow calls to/from, access browser APIs 890, etc.); and run in a secure browser sandbox 850. Note that higher-level languages can be compiled to a WebAssembly module 820 that is then run by the browser in the same sandboxed environment. Moreover, WebAssembly modules 820 compiled from higher-level languages may have been already parsed and compiled/optimized so they can go through a fast-decoding phase (as the module is already in bytecode format close to machine code) before being injected into the JIT compiler 856. As a result, WebAssembly may represent a more efficient/faster way of running code in a browser, using any higher-level language that can target it for development, while being compatible with existing web technologies.

Figure 9:
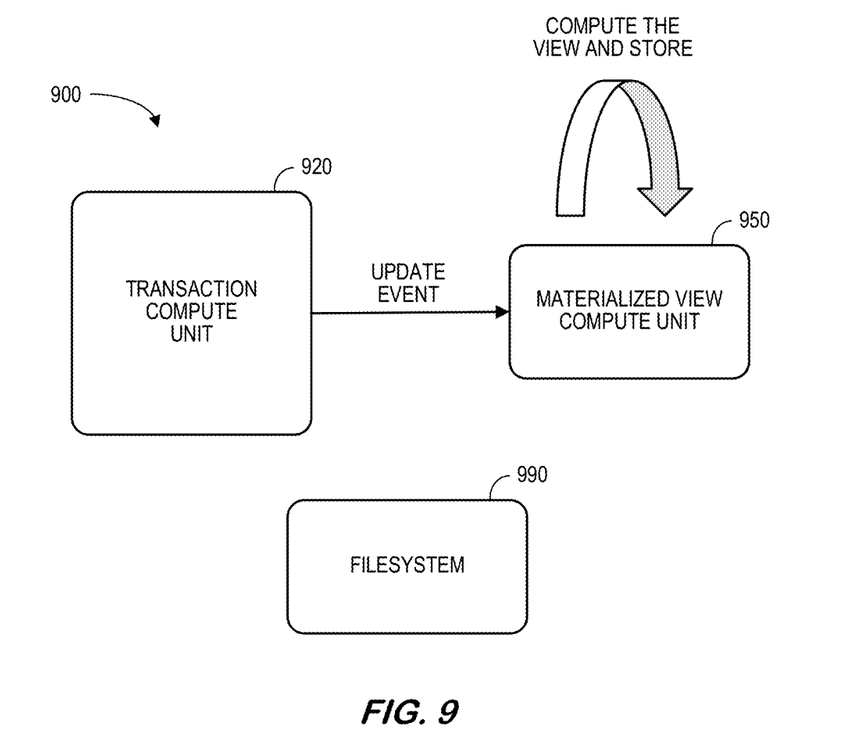
FIG. 9 is a system architecture with a shared filesystem according to some embodiments.

To save storage costs, a transaction compute unit and a materialized view compute unit can share a filesystem. For example, FIG. 9 is a system 900 architecture in which a transaction compute unit 920 and a materialized view compute unit 950 share a filesystem 990. The filesystem 990 may be associated with a method and data structure that are used to control how data is stored and retrieved. In this system 900, the transaction compute unit 920 may just send an update event as, and when, specific tables get updated. The materialized view compute unit 950 can then run the view to refresh code on the materialized view compute unit 950 independently.

Thus, embodiments may separate the processing of materialized view updates and refreshes into a separate set of compute resources as compared to the transaction compute unit. These materialized view compute units can then be independently scaled on-demand as appropriate. Since the materialized view can also be created in a serverless way (depending on the frequency of updates to the views).

Figure 10:
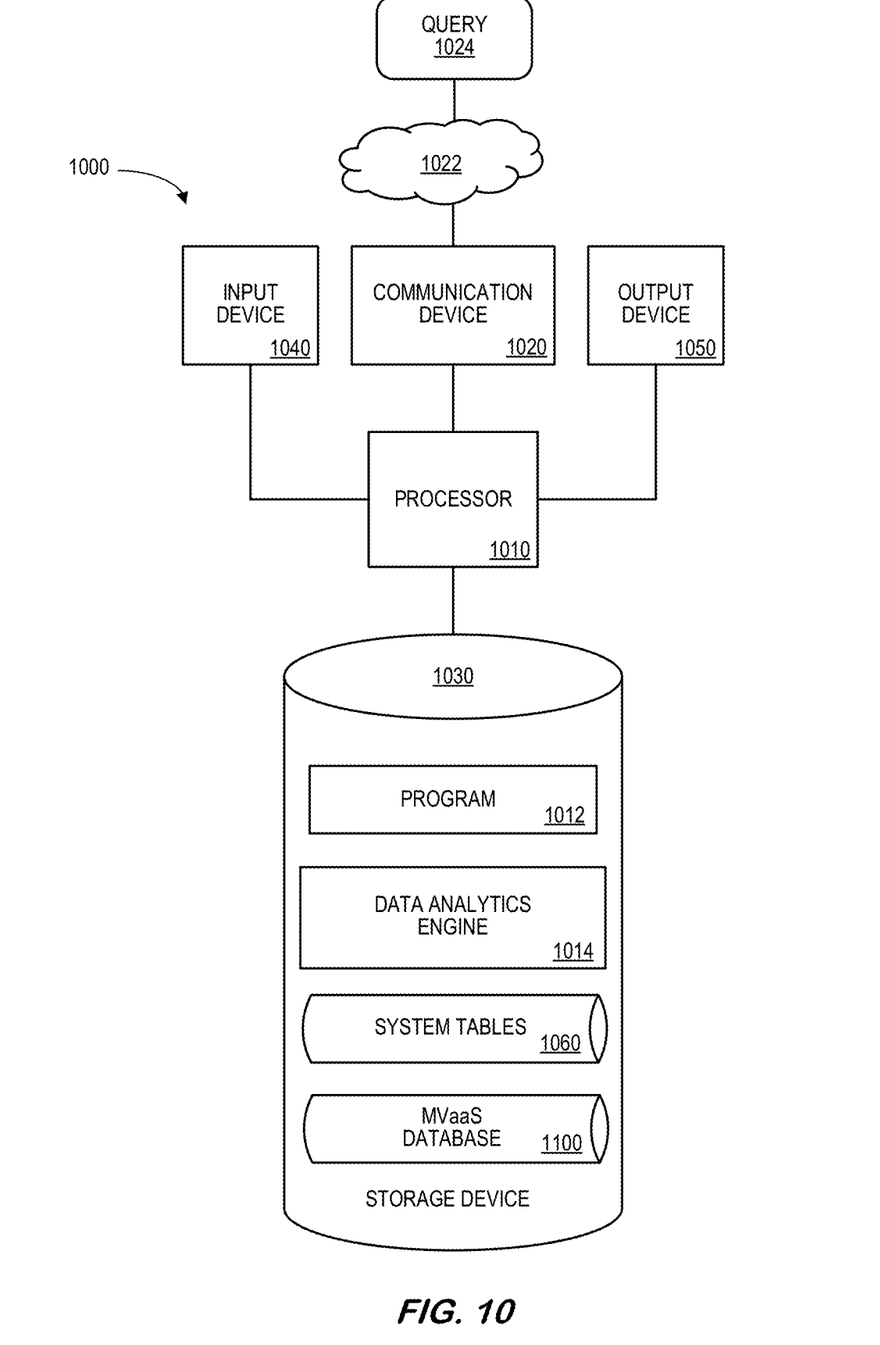
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the systems 300, 600 of FIGS. 3 and 6, respectively (and/or any other system described herein). The platform 1000 comprises a processor 1010, such as one or more commercially available CPUs in the form of one-chip microprocessors, coupled to a communication device 1020 configured to communicate via a communication network (not shown in FIG. 10). The communication device 1020 may be used to communicate, for example, with one or more remote user platforms or a query device 1024 via a communication network 1022. The platform 1000 further includes an input device 1040 (e.g., a computer mouse and/or keyboard to input data about monitored system or data sources) and an output device 1050 (e.g., a computer monitor to render a display, transmit views and/or create monitoring reports). According to some embodiments, a mobile device and/or PC may be used to exchange data with the platform 1000.

The processor 1010 also communicates with a storage device 1030. The storage device 1030 can be implemented as a single database, or the different components of the storage device 1030 can be distributed using multiple databases (that is, different deployment data storage options are possible). The storage device 1030 may comprise any appropriate data storage device, including combinations of magnetic storage devices (e.g., a hard disk drive), optical storage devices, mobile telephones, and/or semiconductor memory devices. The storage device 1030 stores a program 1012 and/or a data analytics engine 1014 for controlling the processor 1010. The processor 1010 performs instructions of the programs 1012, 1014, and thereby operates in accordance with any of the embodiments described herein. For example, the processor 1010 may facilitate data analytics for a cloud computing environment. A plurality of system tables 1060 may store system metadata that associates a first materialized view with a first view and a first table. A transaction compute unit may process an update request relevant to the first view. A query parser may capture the update request from the transaction compute unit and detect which system tables are associated with the update request relevant to the first view. Responsive to the request, the query processor arranges for first table data to be replicated and transmit a materialized view request to a materialized view compute unit. The materialized view compute unit may be created as a MVaaS independent of the transaction compute unit. The materialized view compute unit may receive the materialized view request, refresh the first materialized view, compute the first materialized view, and store a result of the computation.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, data may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further the system tables 1060 and a MVaaS database 1100. An example of a database that may be used in connection with the platform 1000 will now be described in detail with respect to FIG. 11. Note that the database described herein is only one example, and additional and/or different data may be stored therein. Moreover, various databases might be split or combined in accordance with any of the embodiments described herein.

Figure 11:
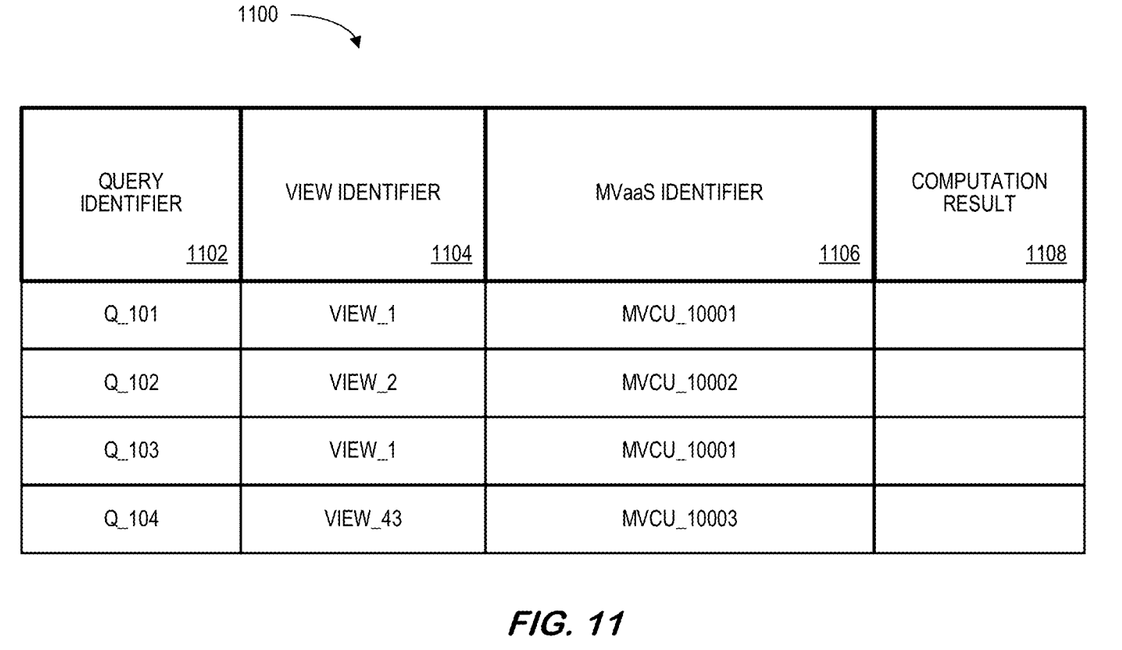
FIG. 11 illustrates a MVaaS database in accordance with some embodiments.

Referring to FIG. 11, a table is shown that represents the MVaaS database 1100 that may be stored at the platform 1000 according to some embodiments. The table may include, for example, entries identifying queries received in connection with a cloud computing environment. The table may also define fields 1102, 1104, 1106, 1108 for each of the entries. The fields 1102, 1104, 1106, 1108 may, according to some embodiments, specify a query identifier 1102, a view identifier 1104, a MVaaS identifier 1106, and a computation result 1108. The MVaaS database 1100 may be created and updated, for example, when a new query is received, when a computation result 1108 is generated, etc.

The query identifier 1102 might be a unique alphanumeric label or link that is associated with a materialized view in the analytics domain. The view identifier 1104 may define the view (e.g., based on information in system tables) and the MVaaS identifier 1106 may specify a serverless material view compute unit spun separately from a transaction compute unit. The computation result 1108 may represent a computation of the view as generated by the MVaaS.

Figure 12:
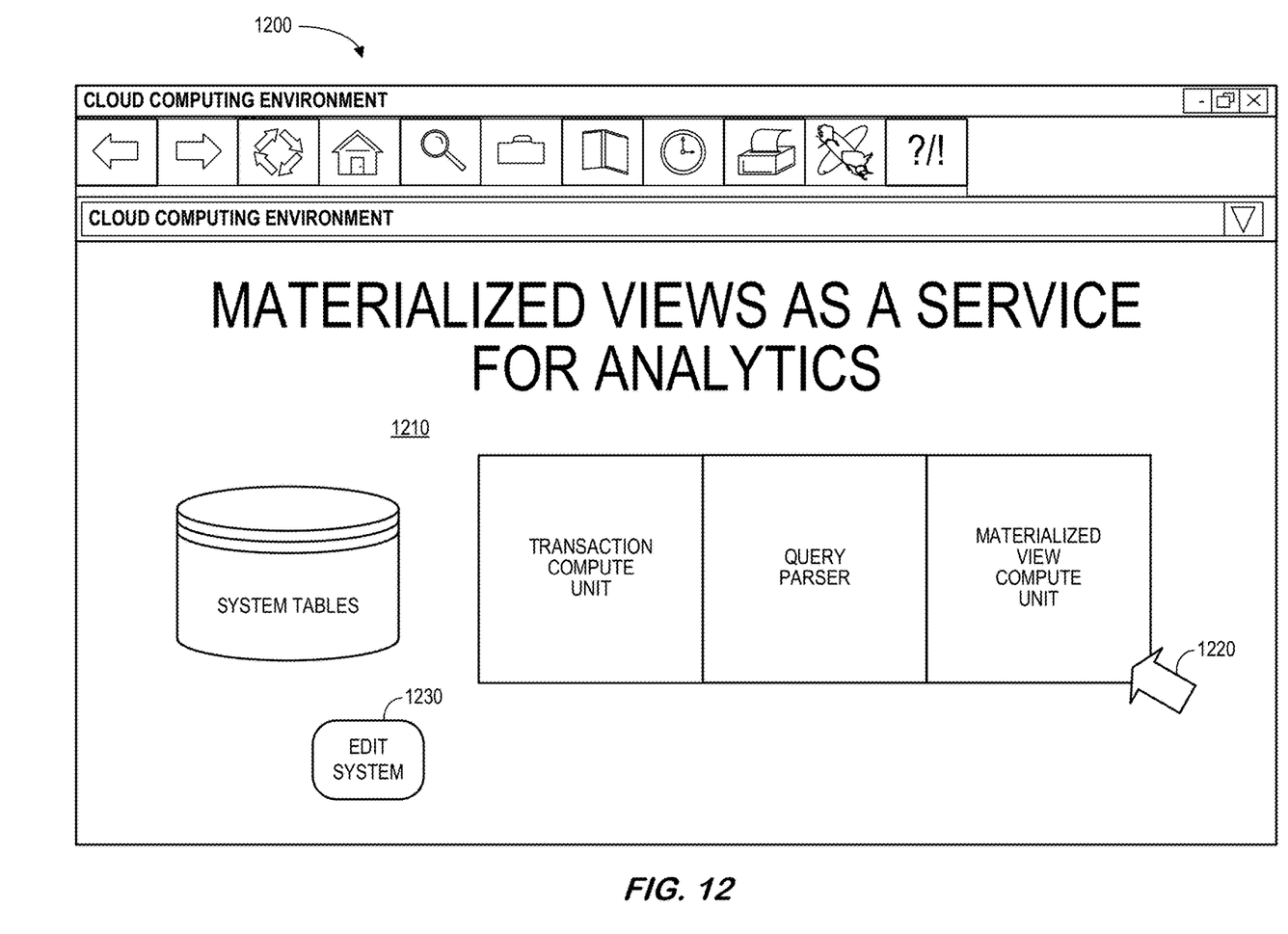
FIG. 12 is a human machine interface display in accordance with some embodiments.

FIG. 12 is a human-machine interface display 1200 in accordance with some embodiments. The display 1200 includes a graphical representation 1210 or dashboard that might be used to manage or monitor a query service for analytics framework (e.g., associated with a cloud provider). In particular, selection of an element (e.g., via a touchscreen or computer mouse pointer 1220) might result in the display of a popup window that contains configuration data. The display 1200 may also include a user selectable "Edit System" icon 1230 that an analyst may use to request system changes (e.g., to investigate or improve system performance).

Thus, embodiments may help perform analytics for a cloud computing environment in a secure and efficient manner. Although some embodiments have been described in connection with an SAP® HANA database embodiments may be associated with other database (e.g., PostgreSQL or ORACLE®) that separate the creation of materialized views from the actual transaction processing unit. This may help build a separation of concerns and an ability to independently scale these based on different requirements. Embodiments may also improve system performance and resource utilization as compared to traditional materialized view approaches.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
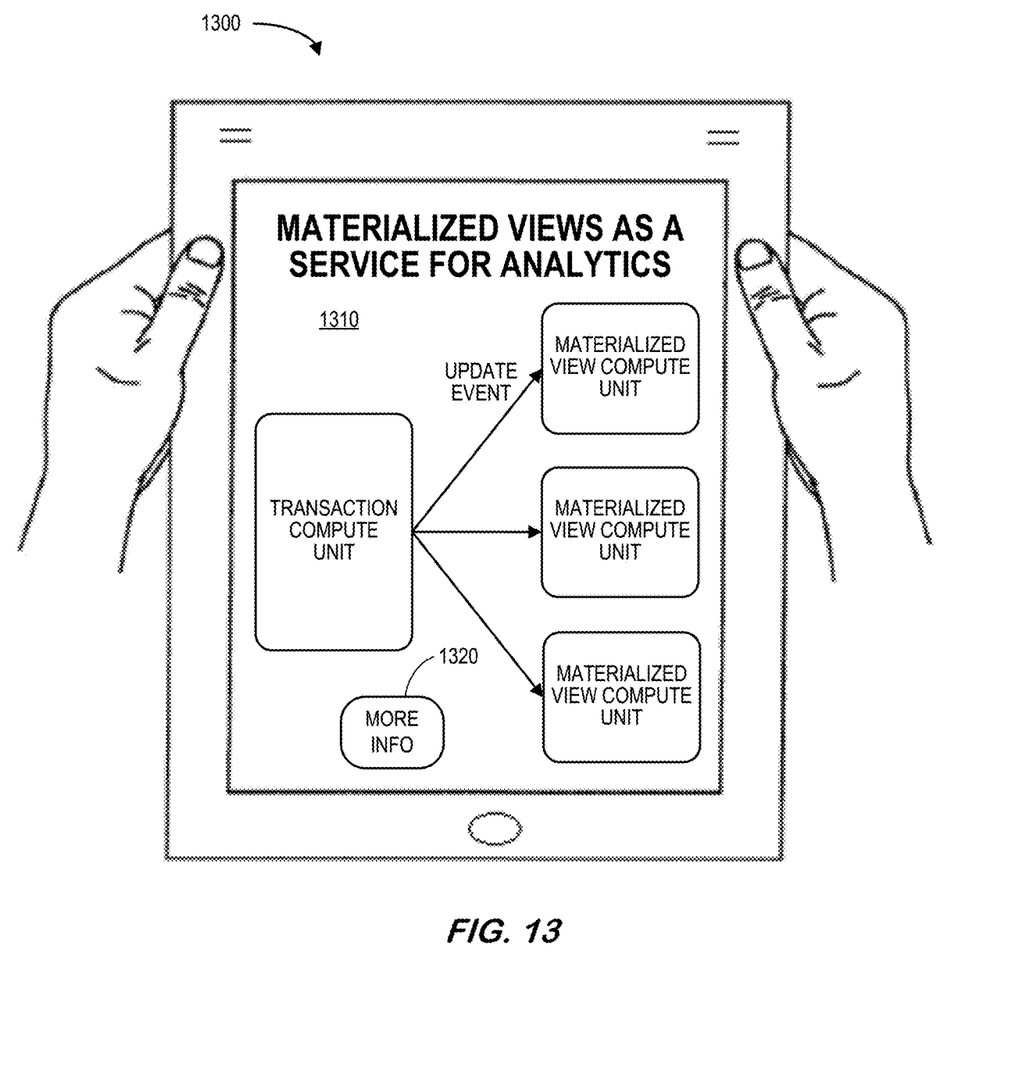
FIG. 13 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of queries, any of the embodiments described herein could be applied to other types of queries. Moreover, the displays shown herein are provided only as examples, and any other type of user interface could be implemented. For example, FIG. 13 shows a handheld tablet computer 1300 rendering a MVaaS for analytics display 1310 that may be used to view or adjust existing system framework components and/or to request additional data about the system configuration (e.g., via a "More Info" icon 1320).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate data analytics for a cloud computing environment, comprising:
   a plurality of system tables storing system metadata that associates a first materialized view with a first view and a first table;
   a transaction compute unit to process an update request relevant to the first view;
   a query parser, including:
      a computer processor, and
      a memory storage device, coupled to the computer processor, including instructions that, when executed by the computer processor, enable the query parser to:
         (i) capture the update request from the transaction compute unit,
         (ii) detect which system tables are associated with the update request relevant to the first view,
         (iii) responsive to the request, arrange for replication of first table data representing the system tables that were detected to be associated with the update request relevant to the first view, and
         (iv) transmit a materialized view request to a materialized view compute unit; and
   the materialized view compute unit, created as a Materialized View-as-a-Service ("MVaaS") independent of the transaction compute unit, to receive the materialized view request, refresh the first materialized view using the replicated first table data, compute the first materialized view, and store a result of the computation.

2. The system of claim 1, wherein compute unit resources of the materialized view compute unit can be scaled independently of those associated with the transaction compute unit.

3. The system of claim 1, wherein a plurality of materialized view compute units are associated with the transaction compute unit.

4. The system of claim 3, wherein the transaction compute unit comprises a database transaction compute unit.

5. The system of claim 1, wherein the computation of the first materialized view comprises serverless execution such that a process is only spun on demand.

6. The system of claim 5, wherein the serverless execution is achieved using a Linux container.

7. The system of claim 5, wherein the serverless execution is achieved using a Web-assembly ("Wasm") module in a Wasm browser sandbox that has a memory heap not accessible from outside the Wasm browser sandbox.

8. The system of claim 1, wherein the transaction compute unit and the materialized view compute unit share a filesystem.

9. The system of claim 8, wherein the update request relevant to the first view is associated with an update event.

10. A computer-implemented method to facilitate data analytics for a cloud computing environment, comprising:
- processing, by a transaction compute unit, an update request relevant to a first view, wherein a plurality of system tables store system metadata that associates a first materialized view with the first view and a first table;
- capturing, by a computer processor of a query parser, the update request from the transaction compute unit;
- detecting which system tables are associated with the update request relevant to the first view;
- responsive to the request, arranging for replication of first table data representing the system tables that were detected to be associated with the update request relevant to the first view;
- transmitting a materialized view request to a materialized view compute unit, created as a Materialized View-as-a-Service ("MVaaS") independent of the transaction compute unit;
- refreshing, by the materialized view compute unit, the first materialized view using the replicated first table data;
- computing the first materialized view by the materialized view compute unit; and
- storing, by the materialized view compute unit, a result of the computation.

11. The method of claim 10, wherein compute unit resources of the materialized view compute unit can be scaled independently of those associated with the transaction compute unit.

12. The method of claim 11, wherein a plurality of materialized view compute units are associated with the transaction compute unit.

13. The method of claim 12, wherein the transaction compute unit comprises a database transaction compute unit.

14. The method of claim 10, wherein the computation of the first materialized view comprises serverless execution such that a process is only spun on demand.

15. The method of claim 14, wherein the serverless execution is achieved using a Linux container.

16. The method of claim 14, wherein the serverless execution is achieved using a Web-assembly ("Wasm") module in a Wasm browser sandbox that has a memory heap not accessible from outside the Wasm browser sandbox.

17. The method of claim 10, wherein the transaction compute unit and the materialized view compute unit share a filesystem.

18. The method of claim 17, wherein the update request relevant to the first view is associated with an update event.

19. A non-transitory, computer readable medium having executable instructions stored therein to perform a method to facilitate data analytics for a cloud computing environment, the method comprising:
- processing, by a transaction compute unit, an update request relevant to a first view, wherein a plurality of system tables store system metadata that associates a first materialized view with the first view and a first table;
- capturing, by a computer processor of a query parser, the update request from the transaction compute unit;
- detecting which system tables are associated with the update request relevant to the first view;
- responsive to the request, arranging for replication of first table data representing the system tables that were detected to be associated with the update request relevant to the first view;
- transmitting a materialized view request to a materialized view compute unit, created as a Materialized View-as-a-Service ("MVaaS") independent of the transaction compute unit;
- refreshing, by the materialized view compute unit, the first materialized view using the replicated first table data;
- computing the first materialized view by the materialized view compute unit; and
- storing, by the materialized view compute unit, a result of the computation.

20. The method of claim 19, wherein compute unit resources of the materialized view compute unit can be scaled independently of those associated with the transaction compute unit.

21. The method of claim 20, wherein a plurality of materialized view compute units are associated with the transaction compute unit.

* * * * *